United States Patent [19]

Mahurin

[11] Patent Number: 5,645,016
[45] Date of Patent: Jul. 8, 1997

[54] CATTLE STABILIZER

[76] Inventor: Dan Mahurin, Rte. 1, Box 114, Republic, Mo. 65738

[21] Appl. No.: 603,340

[22] Filed: Feb. 20, 1996

[51] Int. Cl.[6] ........................................ A61D 3/00
[52] U.S. Cl. ................................................ 119/752
[58] Field of Search ........................ 119/751, 752, 119/729, 732, 725, 728

[56] References Cited

U.S. PATENT DOCUMENTS

| 350,484 | 10/1886 | Gillmore. | |
|---|---|---|---|
| 1,373,921 | 4/1921 | Stultz | 119/752 |
| 1,953,875 | 4/1934 | Babson | 119/148 |
| 2,268,707 | 1/1942 | Huckelbridge | 119/99 |
| 2,537,387 | 1/1951 | Wnetrzak | 17/1 |
| 2,672,126 | 3/1954 | Linton | 119/100 |
| 2,957,451 | 10/1960 | Brockman | 119/96 |
| 3,206,798 | 9/1965 | Aubert | 17/24 |
| 3,683,864 | 8/1972 | Priefert | 119/99 |
| 4,169,429 | 10/1979 | Vass | 119/99 |
| 4,995,335 | 2/1991 | Wright | 119/98 |
| 5,014,648 | 5/1991 | Konitzer | 119/105 |
| 5,035,204 | 7/1991 | Knoss | 119/99 |

FOREIGN PATENT DOCUMENTS

| 835439 | 6/1981 | U.S.S.R. | 119/752 |
|---|---|---|---|
| 82/03153 | 9/1982 | WIPO | 119/752 |

Primary Examiner—Thomas Price

[57] ABSTRACT

An animal stabilizer system for operation by a single user is connected to a conventional livestock squeeze chute for restraining a selected part of an animal. A longitudinally and laterally adjustable telescoping beam is releasably secured to top rails of the chute having an animal securing attachment over any area of the chute.

14 Claims, 3 Drawing Sheets

CATTLE STABILIZER

BACKGROUND ON THE INVENTION

The present invention relates generally to an improved animal stabilizer system, and more particularly, to an animal restraint system which is designed to controllably stabilize a bull for castration. The stabilizer system is designed primarily for castrating bulls, and provides a solid means for temporarily stabilizing a bull undergoing castration or one or more veterinary procedures. The cattle stabilizer system of the present invention is particularly adapted to temporarily restrain a 200–900 pound bull undergoing the castration process wherein a single person must handle the bull in order to complete the castration process. The cattle stabilizer is particularly well adapted for use with animals having a generally rowdy or uncontrollable disposition. In certain other applications, the bull or cow may be restrained for other veterinary procedures such as vaccination, inoculation and artificial insemination.

In the past, various restraint means including cages, pens and the like have been employed for assisting veterinarians while undertaking procedures with animals. It has been found that certain of these restrains are less gentle upon animals and their ability to recall may render the animals difficult to effectively restrain upon subsequent or repeat occasions. It is, of course, always important to provide a means of protecting the individual attending the animal, and it is also equally important to avoid injuring or wounding the animal or otherwise inflicting damage to their bodies, including their bones, flesh, organs including skin, and fur.

Past restraint devices are designed for use by a number of individuals who need to work on a bull. Unfortunately, there are not always a number of individuals to be gathered to work on a bull for veterinary reasons or for other reasons. Moreover, a disabled individual has no chance of performing any necessary medical treatment on a 200–900 pound bull without some easy restraint device which will secure the bull without movement. There are also other reasons for the need to provide a stabilizer for animals. Labor costs of other workers and the convenience of setting up help to work on cattle can be inconvenient, especially these days with farms located so far apart. A prior art method of castrating a calf or a bull is to have one individual hold the front of the bull and the other individuals hold the tail by twisting or bending which often breaks the tail during the bull's movement. Dehorning is also difficult because the tail is often unstabilized and the shoulders are not pushed to the front of the chute which causes the animal to go forward or in reverse and kick.

Accordingly, there is a need for an animal restraint device which will allow one individual to restrain an animal for castration without the assistance of any other individuals. In the past, there have been many chutes and animal restraint devices used on cattle for holding them during a veterinary procedure. A typical cow anti-kick apparatus is disclosed in the patent to Konitzer 5,014,648. The apparatus is used for mounting on the hips of a cow and for effectively discouraging a cow from kicking by holding the root of the tail in an upwardly disposed attitude. The tail is held by a tail holding means which is mounted to a clamping means which grips the hips of the cow. Unfortunately, the anti-kick apparatus disclosed by Konitzer does not fully support the cow off the ground which is necessary for castration procedures. In addition, the apparatus is used for securing the hips which is not a significant part of the necessary stabilizing procedure used during the castration process. Other various prior art procedures use a number of winch and pulley designs in order to control gates which are used to brace a cow during some sort of veterinary procedures. These devices also fail to secure the animal in a lifted position in order for one individual to castrate an animal.

Perhaps the most useful restraint device is disclosed in the patent to Knoss 5,035,204. Knoss discloses a head restraint device attached to a livestock squeeze chute. Knoss teaches the use of an elongated beam mounted on brackets on the upper side rails of the squeeze chute. The elongated beam has two pulleys which control a cable fed from a winch to the animal. Unfortunately, the beam shown in Knoss extends outside the chute and the winch is also mounted at the front end of the chute which limits use of the system.

SUMMARY OF THE INVENTION

It is one object of the present invention, therefore, to provide an improved livestock squeeze chute or an attachment which can be applied to a squeeze chute to assist stabilizing an animal in order to perform various operations on the animal.

It is a further object of the present invention to provide an animal squeeze chute with a telescopically adjustable beam which permits a cable to be positioned over an animal at any area of the squeeze chute.

It is a further object of the present invention to provide a livestock squeeze chute which combines a pulley system and an adjustable overhead beam that permits a cattle chain to be positioned over the animal at any point overhead of the chute.

It is still a further object of the present invention to provide a livestock squeeze chute having side rails with a plurality of holes which permit an adjustable overhead beam to be positioned overhead of the animal overhead of the chute.

It is yet a further object of the present invention to provide a livestock squeeze chute with a pulley support system having a plurality of pulleys which are pivotally mounted and operate in unison to permit a cable to be positioned overhead of the animal located in the livestock squeeze chute.

A further object of the present invention is to provide a livestock squeeze chute with an adjustable winch mounted for movement so that depending on the position of the animal and the beam, the winch can be moved to a position that lessens friction on the cable and thus helps secure the animal without the chance of the cable breaking or slipping off of a pulley.

The easy-does-it stabilizer system therefore provides an arrangement which can be attached any part of animal for applying force to that part of an animal in a direction upwardly from the squeeze chute to further subdue the animal. The device can be applied and removed quickly and easily by a single user.

With the foregoing in view, and other advantages as will become apparent to those skilled in the art to which this invention relates as this specification proceeds, the invention herein is described by reference accompanying drawings forming a part hereof, which includes a description of the best mode known to the Applicant and of the preferred typical embodiment of the principles of the invention.

DETAILED DESCRIPTION OF THE PREFERRED EMBODIMENT

Figure 1:
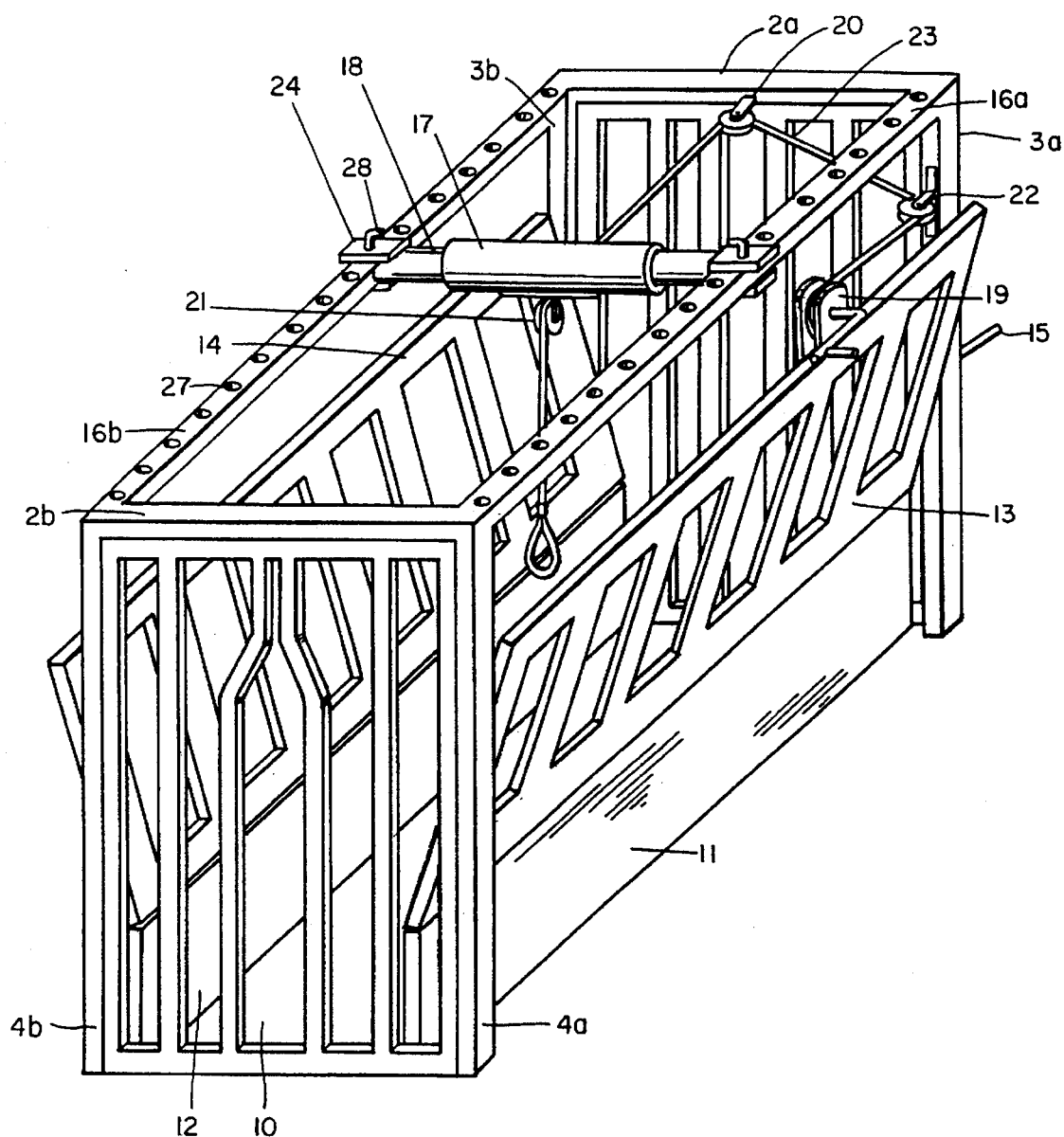
FIG. 1 is a front perspective view of the animal stabilizer system of the present invention.

The easy-does-it stabilizer system is attached to a conventional squeeze chute cage having end rails 2a, 2b, back rails 3a, 3b and front rails 4a, 4b. The chute comprises generally a channel structure 10 defined by two chute sides 11 and 12 between which defines a chute area into which an animal can be lead or driven and then confined in place by squeezing the sides of the chute against the sides of the animal. For this purpose, parallelogram linkages are provided which allow sidebars 13 and 14 to move inwardly and clamp the animal under operation of the actuating lever schematically indicated at 15. As the details of the squeeze chute are not important in the present invention, these are shown schematically for convenience of explanation but it will be appreciated that various different designs of squeeze chutes can be employed and the details of this device will be well apparent to one skilled in the art.

In the squeeze chute arrangement shown in FIG. 1, each side 11 and 12 includes elongated top rails 16a, b forming part of the rigid structure of the squeeze chute and extending longitudinally of the side. The attachment of the present invention is mounted on top rails 16a, b and comprises mounting assembly generally indicated at 17, a telescopic beam 18, a winch assembly 19, a plurality of pulleys 20, 21, 22 and a cable 23 having a free operating end and a captive end attached to the winch assembly 19.

Figure 2:
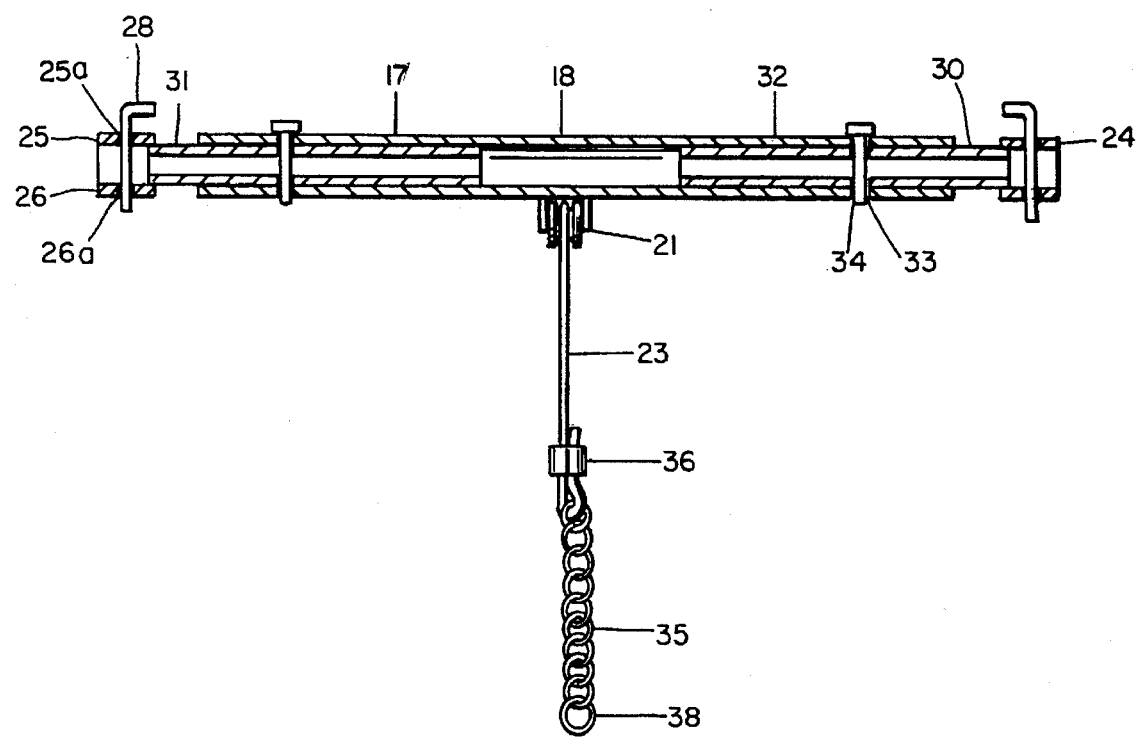
FIG. 2 is a front perspective view of telescopic beam attached to side rails.

The mounting assembly 17 is shown in detail in FIG. 2. The mounting assembly comprises a telescopically adjustable telescopic beam 18 adjustably connected to each top rail and having clamp means 24 welded to each end for securing the beam to top rails. Clamp means 24 includes a top plate 25 having a hole 25a located in the center area and a bottom plate 26 having a hole 26a located in the center area. The holes 25a, 26a are made to align with holes 27 formed in side rails 16a, b. The holes 27 formed in side rails 16a, b extend entirely through the rail. Pins 28 are placed through holes 25a, 26a and 27 to secure the beam across the chute. The holes 27 are strategically located along the entire length of the side rails to permit the beam to be positioned overhead of the animal at any point overhead of the chute. Accordingly, the user may selectively work on any part of the animal by sliding the telescopic beam 18 to a selected position and using the pins to secure the beam in place. Concluding with FIG. 2, telescopic beam 18 is comprised of a pair of inner struts 30, 31 and an outer adjustable tubular member 32. Inner struts 30, 31 and tubular member 32 are provided with a plurality of holes 33 which mate and are connected by pins 34. By sliding the tubular member, the pulley can be adjusted to at least three different positions. Welded to tubular member 32 is a first pulley 21. The pulley 21 permits cable 23 to extend down to an area near the animal. Since tubular member 32 can slide on struts 30, 31, the pulley can be moved laterally overhead in either direction to position the pulley over the animal in any one of a number of selected positions. The cable is connected to a calf pulling chain 35 by a U-bolt clamp 36. The calf pulling chain is used to secure a portion of the animal through the use of a releasable clamp 38. The clamp is used to secure one of a selected number of securing attachments such as the chain as illustrated or any one of a number of clips or harnesses well known in the art.

Figure 3:
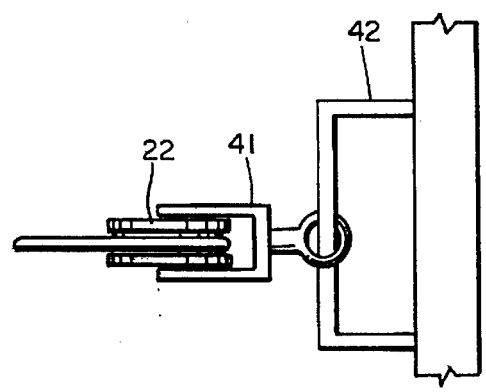
FIG. 3 is a close up view of swivel mounted pulley.
Figure 4:
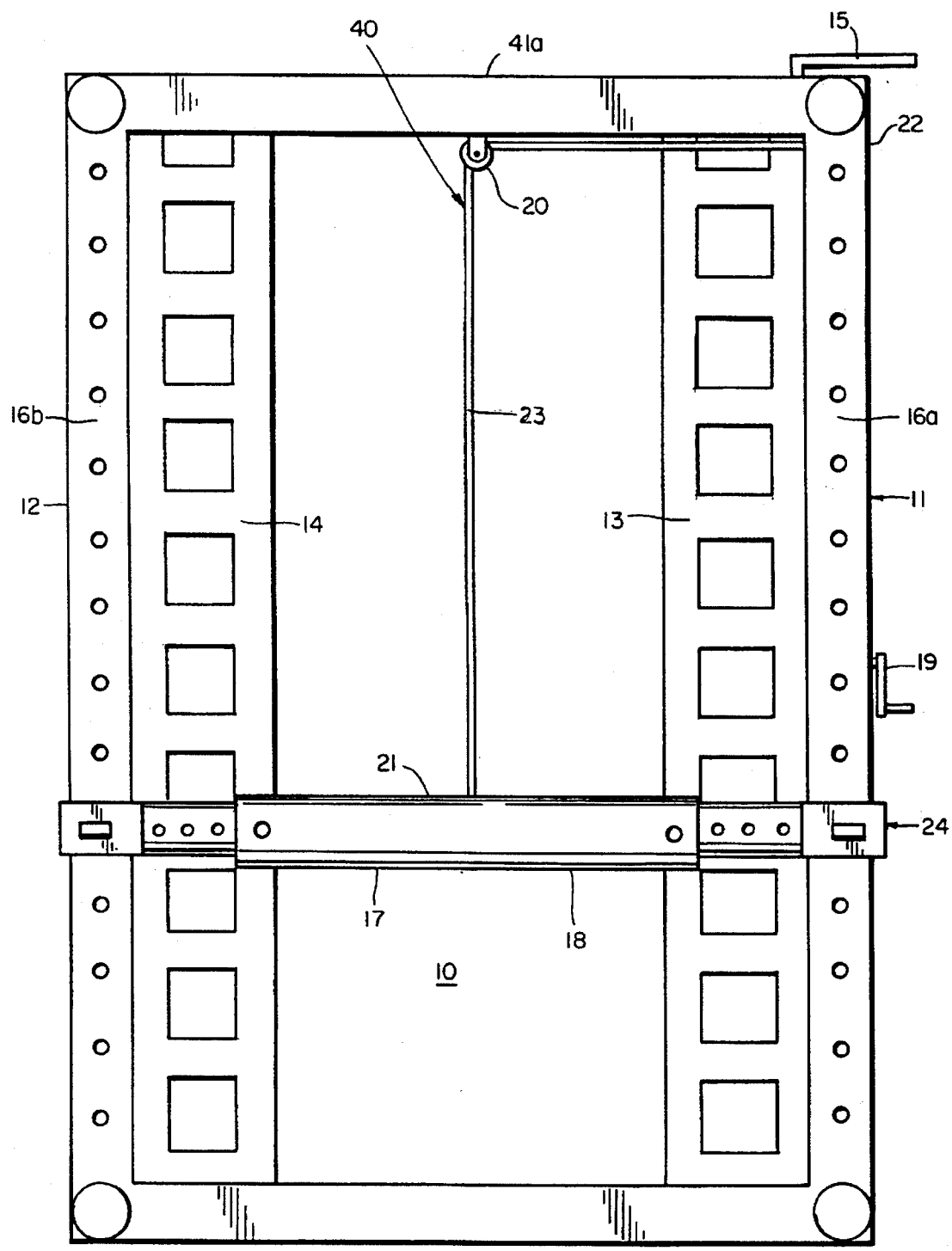
FIG. 4 is an overhead view of the animal stabilizer system of the present invention.

The operation of pulley support system 40 will now be described in detail. Second pulley 20 is pivotally mounted on top end rail 41a. The pulley 20 is capable of pivoting to permit adjustment as the telescopic beam 18 is located at any number of positions along the side rails. As pulley 21 is positioned laterally in either direction, the ability of pulley 20 to pivot lessens the friction on the cable. A third pulley 22, as shown in FIG. 3, is mounted to swivel 41 and operate in unison with pulley 20. Pulley 22 is mounted by swivel 41 onto leg 42 which extends from the chute. Winch assembly 19 is strategically mounted on movable side bar 13, unlike prior art systems where the winch is mounted on a standard portion of the chute, the winch assembly 19 is mounted for movement so that depending on the position of the animal and the beam 18, the winch can be moved to a position that lessens friction on the cable and thus helps secure the animal without the chance of the cable breaking or slipping off a pulley. The cable passes over the pulleys such that the free end depends from pulley 21. Accordingly, actuation of the winch causes the free end of the cable to be pulled upwardly for applying force to a chain engaging part of the animal, lifting the animal upwardly to stabilize and subdue the animal.

The variety of adjustable parts permits the various uses of the easy does it stabilizer system. The beam is merely moved overhead of the animal to a selected position and the chain is wrapped around a particular animal part until the animal is secured. The easy-does-it stabilizer system allows a single user, even a disabled individual, to perform operation on an animal without the help of other individuals.

I claim:

1. An animal squeeze chute having a chute area comprising:

a pair of chute moveable sides defining a channel therebetween into which the body of an animal to be confined can be received;

each side having an elongated top rail extending longitudinally of the side;

a telescopically adjustable beam adjustably connected to each top rail, said beam having a pair of inner struts connected to a slidably adjustable outer tubular member, said tubular member supporting and adjustably positioning said first pulley over the chute area;

a second pulley pivotally mounted on an end rail of said chute;

a third pulley pivotally mounted on a back rail of said chute;

a winch assembly mounted on a side bar of one of said chute sides;

a cable having a free operating end and a captive end attached to said winch assembly for winding thereon, said cable passing over said pulleys such that the free end depends from said first pulley and such that actuation of the winch assembly causes the free end of the cable to be pulled upwardly for applying force to a chain for engaging a part of the animal, whereby the part of the animal in the chute is pulled upwardly and toward the pulley to subdue the animal.

2. The chute as claimed in claim 1 further comprising damping means connected to each one of said inner struts for securing said telescopingly adjustable beam to said top rails.

3. The chute as claimed in claim 1 further comprising a swivel connected to said third pulley.

4. The chute as claimed in claim 1 further comprising a pivoting support member mounted to said second pulley and to said end rail.

5. The chute as claimed in claim 1, said telescopically adjustable beam further comprising pins which adjustably secure said outer tubular member to said inner struts in at least three different positions.

6. The chute as claimed in claim 1, said winch assembly is mounted on said side bar for movement with one of said chute sides to prevent unnecessary friction on said cable.

7. The chute as claimed in claim 1, said cable including a connector at said free end, said connector having a releasable clamp.

8. An animal stabilizer system mounted on an animal squeeze chute for securing an animal in a chute area, said system comprising:

a squeeze chute cage, said cage having movable sides, top side rails, top end rails, front posts and rear posts;

a telescopically adjustable beam adjustably connected to each top side rail, said beam having a pair of inner struts connected to a slidably adjustable outer tubular member, said tubular member supporting and adjustably positioning said first pulley over the chute area;

a second pulley pivotally mounted on one of said top end rails of said chute;

a third pulley pivotally mounted on a back rail of said chute;

a winch assembly mounted on a side bar of one of said moveable sides of said chute; and a cable having a free operating end and a captive end attached to said winch assembly for winding thereon, said cable passing over said pulleys such that the free end depends from said first pulley and such that actuation of the winch assembly causes the free end of the cable to be pulled upwardly for applying force to a chain for engaging a part of the animal, whereby the part of the animal in the chute is pulled upwardly and toward the pulley to subdue the animal.

9. The chute as claimed in claim 8 further comprising clamping means connected to each one of said inner struts for securing said telescopingly adjustable beam to said top side rails.

10. The chute as claimed in claim 8 further comprising a swivel connected to said third pulley.

11. The chute as claimed in claim 8 further comprising a pivoting support member mounted to said second pulley and to one of said top end rails.

12. The chute as claimed in claim 8, said telescopically adjustable beam further comprising pins which adjustably secure said outer tubular member to said inner struts in at least three different positions.

13. The chute as claimed in claim 8, said winch assembly is mounted on said side bar for movement with said side bar of one of said moveable sides to prevent unnecessary friction on said cable.

14. The chute as claimed in claim 8, said cable including a connector at said free end, said connector having a releasable clamp.

* * * * *